United States Patent
Hasushita et al.

[11] Patent Number: 5,969,880
[45] Date of Patent: Oct. 19, 1999

[54] ZOOM LENS SYSTEM

[75] Inventors: Sachio Hasushita, Hokkaido; Takayuki Ito, Saitamaken; Takashi Enomoto, Chiba-ken, all of Japan

[73] Assignee: Asahi Kogaku Kogyo Kabushiki Kaisha, Tokyo, Japan

[21] Appl. No.: 09/045,110

[22] Filed: Mar. 20, 1998

[30] Foreign Application Priority Data

Mar. 21, 1997 [JP] Japan .................................. 9-068284

[51] Int. Cl.⁶ .................................................. G02B 15/14
[52] U.S. Cl. ................................................................ 359/689
[58] Field of Search .................................. 359/689, 683, 359/676

[56] References Cited

U.S. PATENT DOCUMENTS

| | | | |
|---|---|---|---|
| 4,330,181 | 5/1982 | Okudaira | 359/690 |
| 4,978,204 | 12/1990 | Ito | 359/689 |
| 4,983,027 | 1/1991 | Kojima | 359/689 |
| 5,572,365 | 11/1996 | Ito | 359/689 |
| 5,777,799 | 7/1998 | Miyauchi | 359/689 |
| 5,793,533 | 8/1998 | Yoneyama et al. | 359/689 |
| 5,793,535 | 8/1998 | Ito et al. | 359/689 |
| 5,838,500 | 11/1998 | Ito et al. | 359/689 |

FOREIGN PATENT DOCUMENTS 9-120028   5/1997   Japan .

*Primary Examiner*—Scott J. Sugarman
*Attorney, Agent, or Firm*—Greenblum & Bernstein P.L.C.

[57] ABSTRACT

A zoom lens system comprising at least three lens groups including a positive first lens group, a positive second lens group having at least one negative lens element, and a third lens group having a negative focal length, wherein upon zooming from the shortest focal length toward the longest focal length, all the lens groups are moved toward the object side, and the distance between the first and second lens groups increases and the distance between the second and third lens groups decreases, and wherein the system satisfies the conditions (1) $-0.3 < f_W/f_{1G} + f_W/f_{2G} + f_W/f_{3G} < 0$, and (2) $1.845 < N_{2Gn}$, wherein $f_W$ designates the focal length of the entire optical system at the short focal length extremity, $f_{1G}$ designates the focal length of the first lens group ($f_{1G} > 0$), $f_{2G}$ designates the focal length of the second lens group ($f_{2G} > 0$), $f_{3G}$ designates the focal length of the third lens group ($f_{3G} < 0$), $N_{2Gn}$ designates the average refractive index of all the negative lens elements of the second lens group.

5 Claims, 9 Drawing Sheets

SPHERICAL ABERRATION
SINE CONDITION

SPHERICAL ABERRATION
CHROMATIC ABERRATION

ASTIGMATISM

DISTORTION

Fig.3A     Fig.3B     Fig.3C     Fig.3D
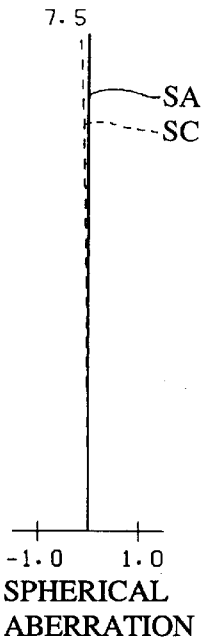
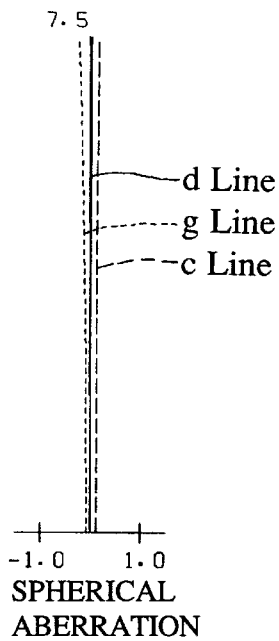
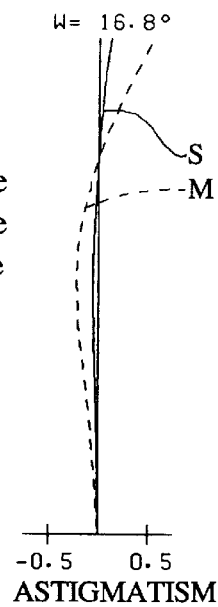
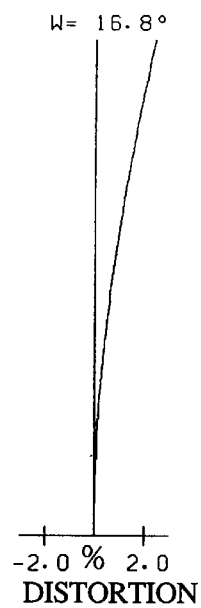
SPHERICAL ABERRATION  
SINE CONDITION
SPHERICAL ABERRATION  
CHROMATIC ABERRATION
ASTIGMATISM
DISTORTION
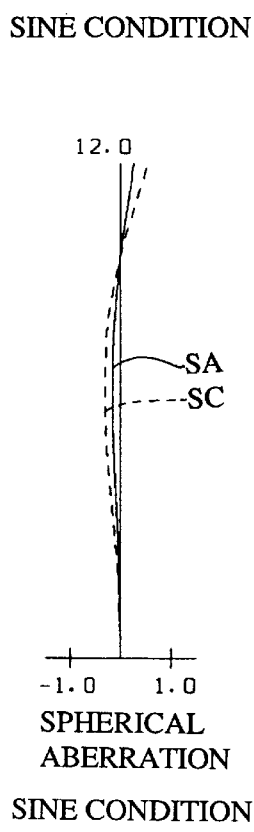
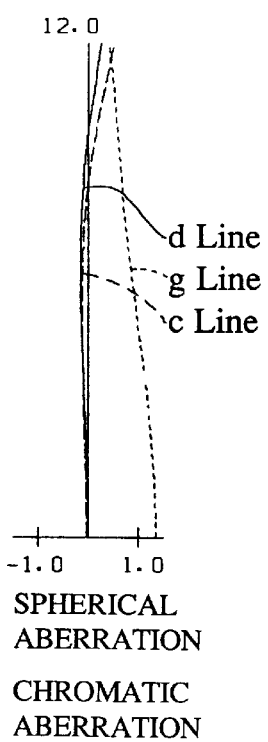
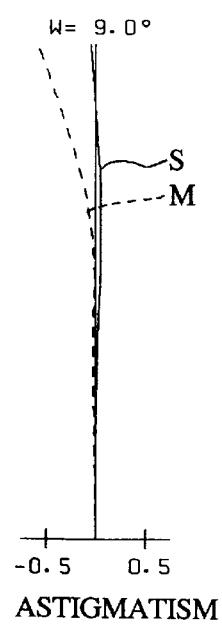
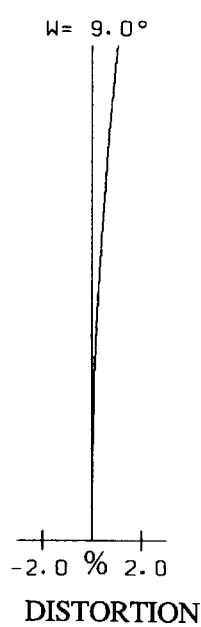
SPHERICAL ABERRATION  
SINE CONDITION
SPHERICAL ABERRATION  
CHROMATIC ABERRATION
ASTIGMATISM
DISTORTION
Fig.4A     Fig.4B     Fig.4C     Fig.4D

Fig. 5
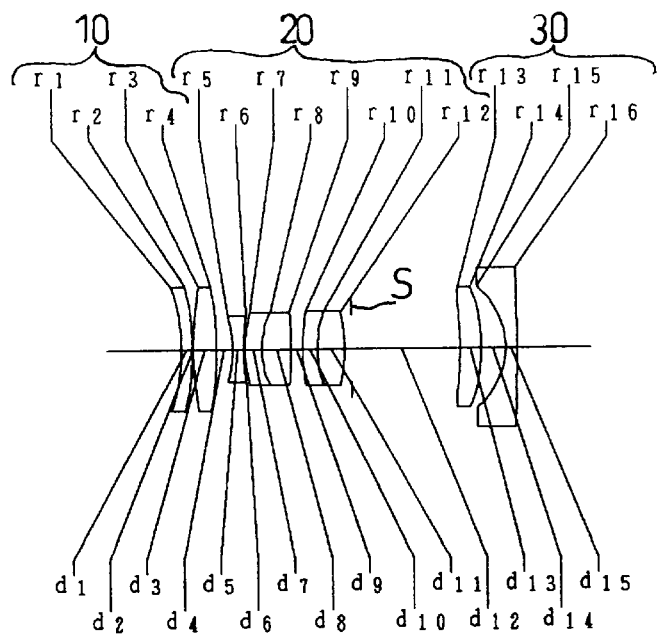
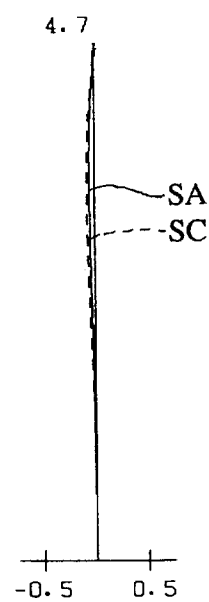
Fig. 6A
SPHERICAL
ABERRATION
SINE CONDITION
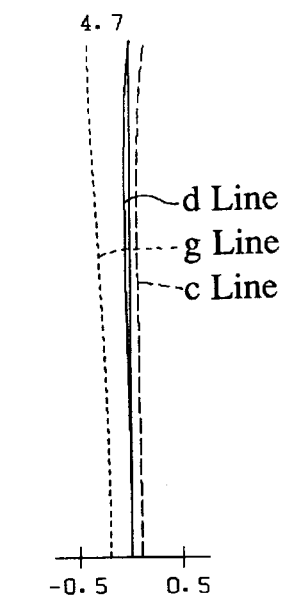
Fig. 6B
SPHERICAL
ABERRATION
CHROMATIC
ABERRATION
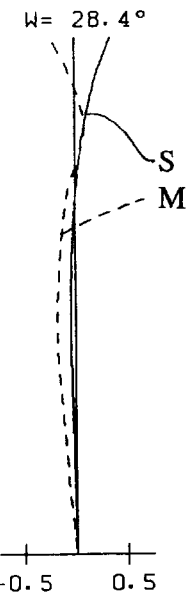
Fig. 6C
ASTIGMATISM
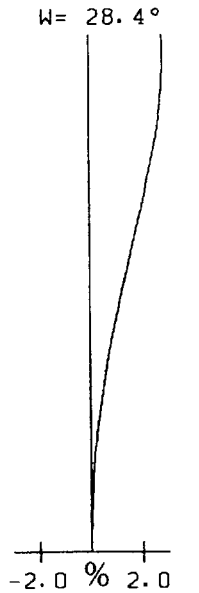
Fig. 6D
DISTORTION

| SPHERICAL ABERRATION SINE CONDITION | SPHERICAL ABERRATION CHROMATIC ABERRATION | ASTIGMATISM | DISTORTION |

Fig.13
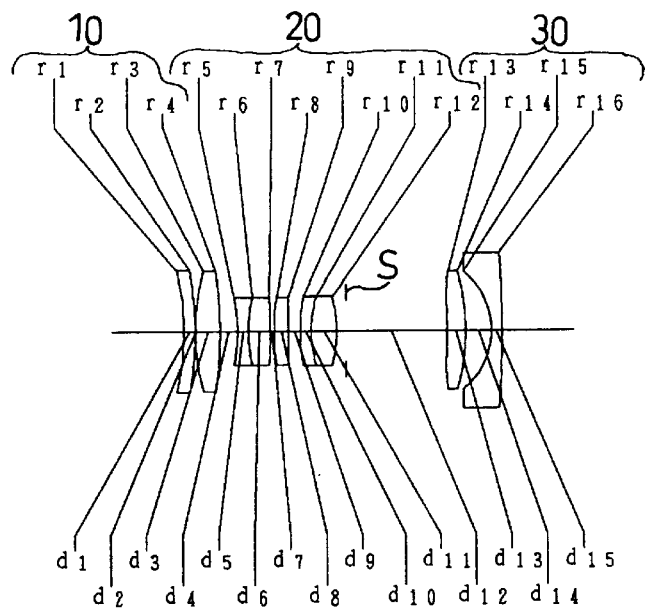
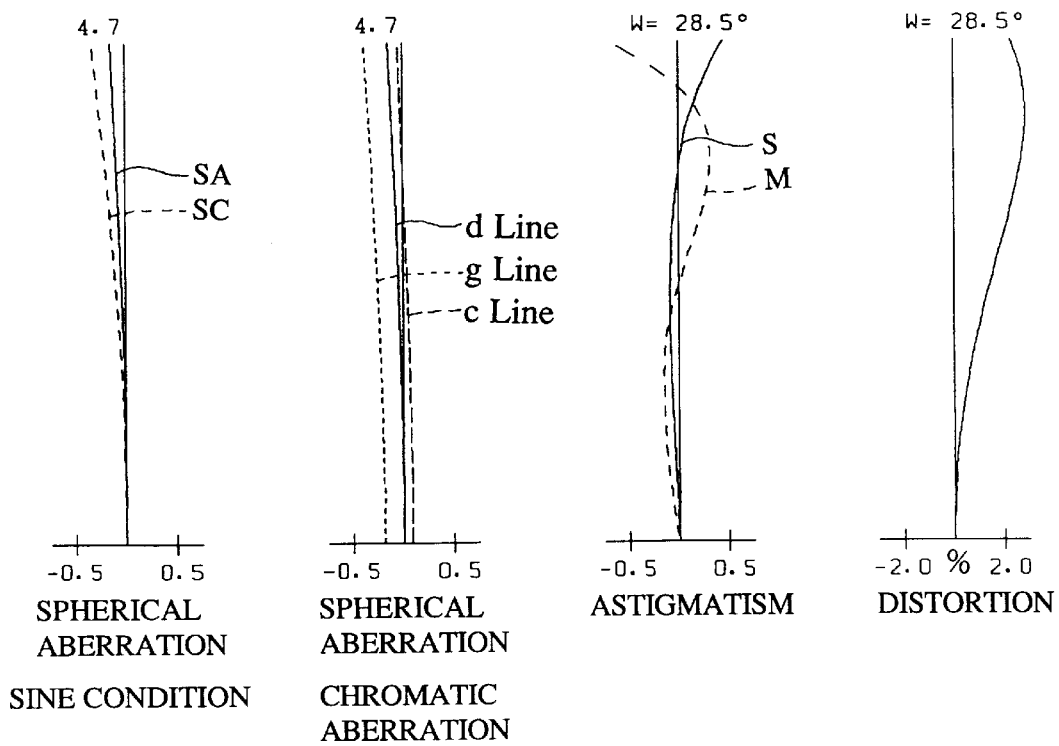
Fig.14A SPHERICAL ABERRATION SINE CONDITION
Fig.14B SPHERICAL ABERRATION CHROMATIC ABERRATION
Fig.14C ASTIGMATISM
Fig.14D DISTORTION

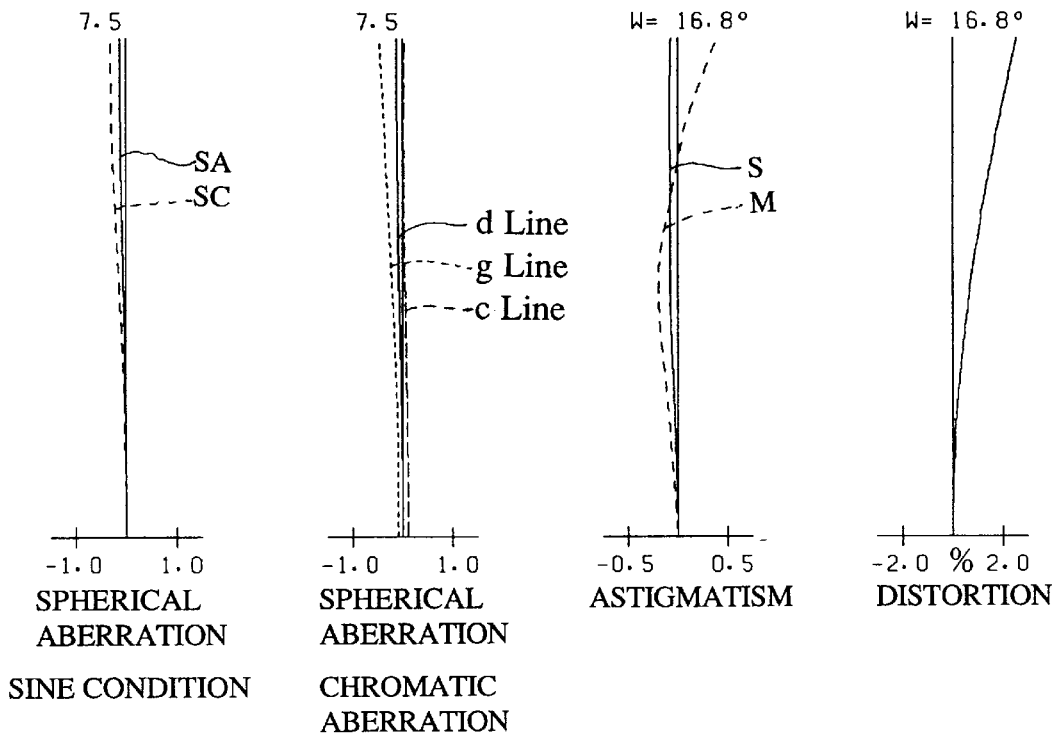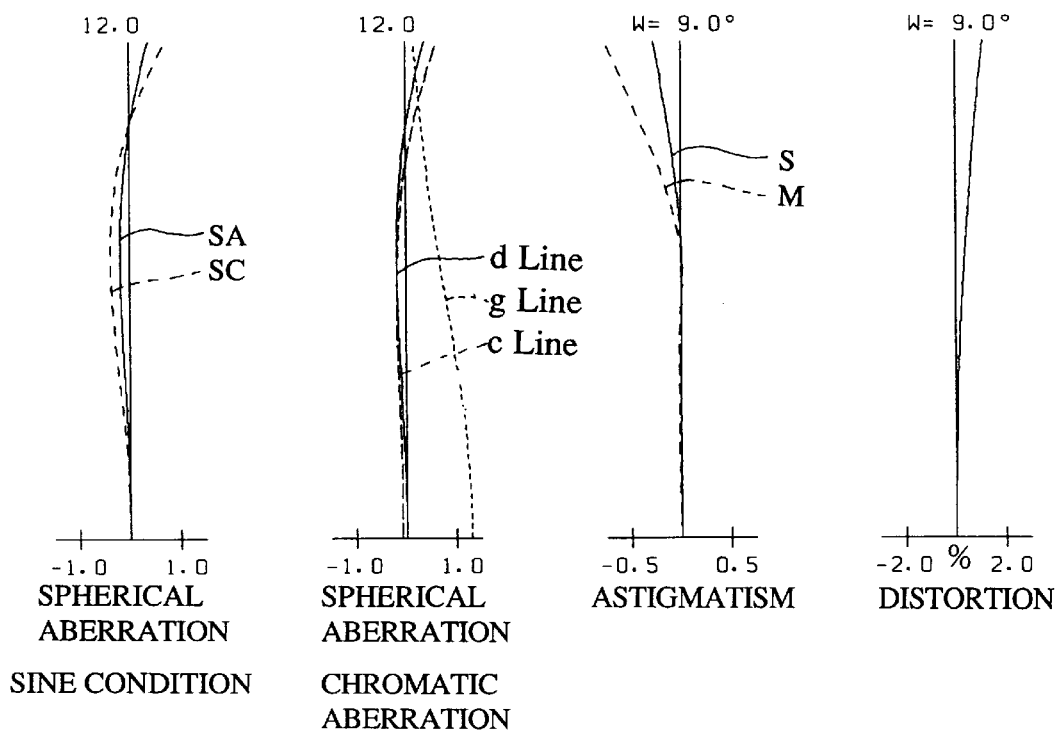

ZOOM LENS SYSTEM

BACKGROUND OF THE INVENTION

1. Field of the Invention

The present invention relates to a zoom lens system for a compact camera having a back focal distance smaller than that of a single lens reflex camera, and in particular, relates to a miniaturized zoom lens system with a high zoom ratio.

2. Description of the Related Art

In a zoom lens of a compact camera, there has been a need to attain a high zoom ratio of more than 3, and miniaturize the zoom lens itself. To meet this requirement, the Petzval sum has a tendency to become a large negative number, so that it is difficult to compensate astigmatism and field curvature particularly at the wide angle extremity (short focal length side).

SUMMARY OF THE INVENTION

It is an object of the present invention to provide a smaller zoom lens system, for a compact camera, having a high zoom ratio in which aberrations can be effectively compensated.

To achieve the object mentioned above, according to the present invention, there is provided a zoom lens system comprising at least three lens groups including a first lens group having a positive focal length, a second lens group having a positive focal length and having at least one negative lens element, and a third lens group having a negative focal length, in this order from the object side, wherein upon zooming from the short focal length extremity toward the long focal length extremity, all the lens groups are moved toward the object side and the distance between the first and second lens groups increases and the distance between the second and third lens groups decreases, and wherein said zoom lens system satisfies the following conditions (1) and (2):

$$-0.3 < f_W/f_{1G} + f_W/f_{2G} + f_W/f_{3G} < 0 \quad (1)$$

$$1.845 < N_{2Gn} \quad (2)$$

wherein $f_W$ designates the focal length of the entire optical system at the short focal length extremity, $f_{1G}$ designates the focal length of the first lens group ($f_{1G} > 0$), $f_{2G}$ designates the focal length of the second lens group ($f_{2G} > 0$), $f_{3G}$ designates the focal length of the third lens group ($f_{3G} < 0$), $N_{2Gn}$ designates the average refractive index of all the negative lens elements of the second lens group.

The first lens group preferably comprises a negative lens element and a positive lens element, in this order from the object side.

The third lens group preferably comprises a positive lens element and a negative lens element, in this order from the object side.

Preferably, the zoom lens system further satisfies the following condition (3) and/or condition (4):

$$0.05 < \Sigma d_{1G}/f_W < 0.2 \quad (3)$$

$$0.1 < \Sigma d_{3G}/f_W < 0.25 \quad (4)$$

wherein $\Sigma d_{1G}$ designates the distance along the optical axis between the most object-side surface and the most image-side surface of the first lens group;

wherein $\Sigma d_{3G}$ designates the distance along the optical axis between the most object-side surface and the most image-side surface of the third lens group.

The present disclosure relates to subject matter contained in Japanese Patent Application No.09-68284 (filed on Mar. 21, 1997) which is expressly incorporated herein by reference in its entirety.

BRIEF DESCRIPTION OF THE DRAWINGS

The invention will be described below in detail with reference to the accompanying drawings, in which;

FIG. 3A, 3B, 3C, 3D show aberration diagrams of the zoom lens system shown in FIG. 1, at an intermediate focal length;

FIG. 4A, 4B, 4C, 4D show aberration diagrams of the zoom lens system shown in FIG. 1, at the long focal length extremity;

FIG. 5 is a schematic view of a lens arrangement of the zoom lens system according to the second embodiment of the present invention;

FIG. 6A, 6B, 6C, 6D show aberration diagrams of the zoom lens system shown in FIG. 5, at the short focal length extremity;

FIG. 13 is a schematic view of a lens arrangement of the zoom lens system according to the fourth embodiment of the present invention;

FIG. 14A, 14B, 14C, 14D show aberration diagrams of the zoom lens system shown in FIG. 13, at the short focal length extremity;

FIG. 15A, 15B, 15C, 15D show aberration diagrams of the zoom lens system shown in FIG. 13, at an intermediate focal length;

FIG. 16A, 16B, 16C, 16D show aberration diagrams of the zoom lens system shown in FIG. 13, at the long focal length extremity; and, FIG. 17 is a conceptual view of a lens arrangement of a zoom lens system and tracks of the movement of the lenses during zooming, according to the present invention.

DESCRIPTION OF THE PREFERRED EMBODIMENT

Figure 17:
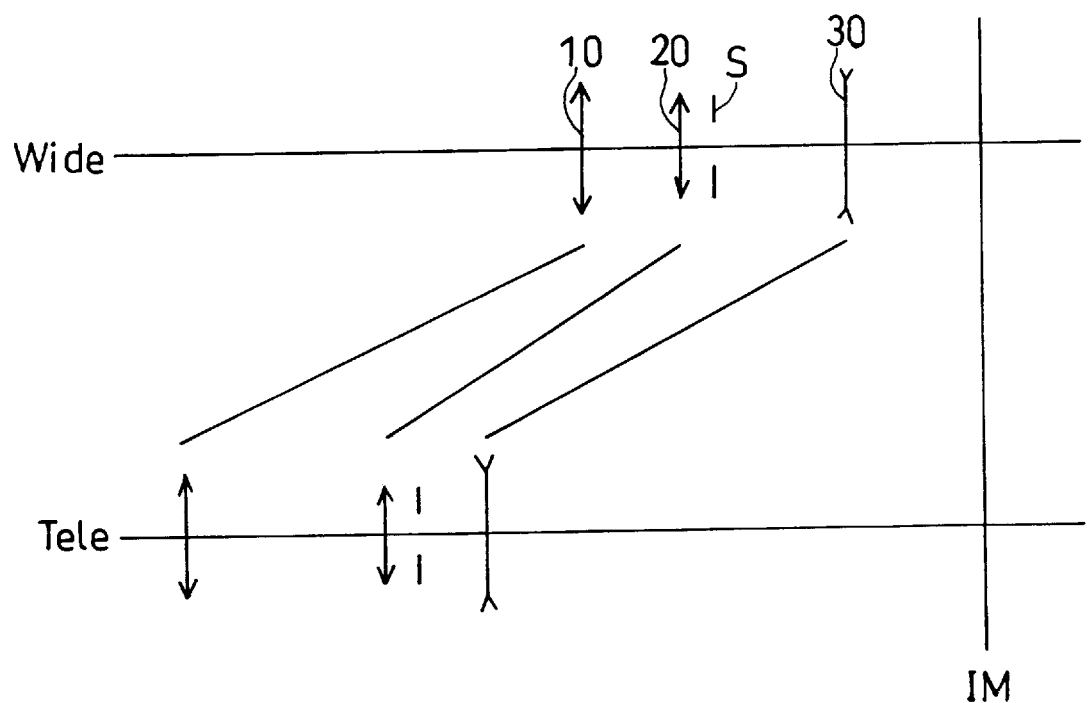

In the illustrated embodiment, as can be seen in FIG. 17, a zoom lens system comprises a first lens group 10 having a positive focal length, a second lens group 20 having a positive focal length and having at least one negative lens element, and a third lens group 30 having a negative focal length, in this order from the object side. Upon zooming from the shorter focal length position to the longer focal length position, the three lens groups are all moved toward the object side, and at the same time the distance between the first lens group 10 and the second lens group 20 increases and the distance between the second lens group 20 and the third lens group 30 decreases, respectively. A diaphragm S is provided between the second and third lens groups 20 and 30 and moves together with the second lens group 20. The focusing is carried out by the second lens group 20.

Condition (1) specifies the power (focal length) of each lens group. When condition (1) is satisfied, a high zoom ratio can be obtained by a small movement of the lens groups. A zoom lens comprises at least three lens groups having a positive lens group, a positive lens group and a negative lens group in this order from the object side is per se known. However, in a conventional zoom lens, the movement of each lens group is relatively large, and hence, difficult to obtain a miniaturized camera. If the power of the third lens group which is the sole negative lens group is increased so as to satisfy condition (1), it is possible to provide a smaller zoom lens system with a high zoom ratio of more than 3.

If the ratio defined in condition (1) is above the upper limit, the movement of each lens group is large, hindering possible miniaturization of the zoom lens.

Conversely, if the ratio defined in condition (1) is below the lower limit, the negative power of the third lens group becomes too large, hindering possible correction of astigmatism and field curvature.

To further increase the zoom ratio and miniaturize the zoom lens system, it is preferable that the following condition (1') in which the upper limit in condition (1) is replaced with −0.1 is satisfied.

$$-0.3 < f_W/f_{1G} + f_W/f_{2G} + f_W/f_{3G} < -0.1 \quad (1')$$

Condition (2) specifies the refractive index of the negative lens element of the second lens group. If condition (2) is satisfied, the negative Petzval sum is converted to the positive direction to thereby compensate field curvature.

In particular, when condition (1) is satisfied, the Petzval sum tends to be a large negative value, and the sagittal image surface at the wide-angle position (the short focal length extremity) is largely bent in the positive (i.e., plus (+)) direction) at a high image height. In addition, the astigmatic difference is also intensified, thus resulting in a deteriorated optical performance. Condition (2) specifies the requirement to compensate these problems caused by condition (1). Namely, the Petzval sum of the second lens group having a positive focal length is corrected to the positive direction by increasing the refractive index of the negative lens element of the second lens group. If the average value of the refractive index of the negative lens element (or elements) of the second lens group is smaller than the lower limit in condition (2), the Petzval sum becomes impossible to compensate, consequently, hindering possible compensation of field curvature.

Conditions (3) and (4) relate to the thickness of the first and third lens groups, respectively. These conditions indicate the conditions to curb the increase of the thickness of the two lens groups, while attaining increased power, so that a smaller zoom lens system can be obtained. The first lens group preferably comprises a negative lens element and a positive lens element, in this order from the object side. The third lens group is preferably comprises a positive lens element and a negative lens element, in this order from the object side.

If the ratio defined in condition (3) is above the upper limit, the thickness of the first lens group is increased, so that a reduction in length of the entire lens system can not be attained. If the ratio is below the lower limit in condition (3), it is impossible to increase the power of the first lens group, and hence the travelling distances of the lenses are increased. Also, correction of aberration in the first lens group will be insufficient, so that fluctuation of aberration is amplified.

If the ratio defined in condition (4) is above the upper limit, the thickness of the third lens group is increased, so that a reduction in length of the entire lens system can not be attained. If the ratio is below the lower limit in condition (4), it is impossible to increase the power of the third lens group, and hence the travelling distances of the lenses are increased. Also, the distance between the lens elements is reduced, and hence if the power of the third lens group is increased, any correction of aberration in the first lens group will be insufficient, so that fluctuation of aberration is amplified.

Numerical examples (Embodiments 1 through 4) of the zoom lens system of the present invention will be discussed.

EXAMPLE 1

Figure 1:
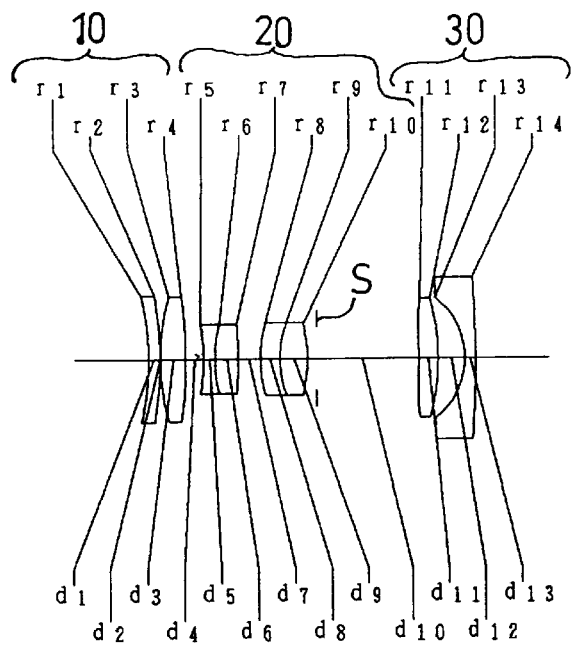
FIG. 1 is a schematic view of a lens arrangement of a zoom lens system according to the first embodiment of the present invention.
Figure 2A:
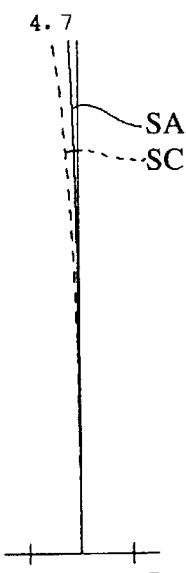
FIG. 2A, 2B, 2C, 2D show aberration diagrams of the zoom lens system shown in FIG. 1, at the short focal length extremity.
Figure 2B:
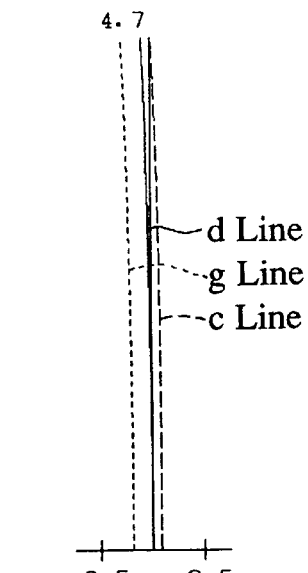
Figure 2C:
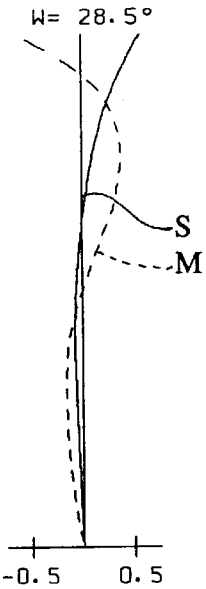
Figure 2D:
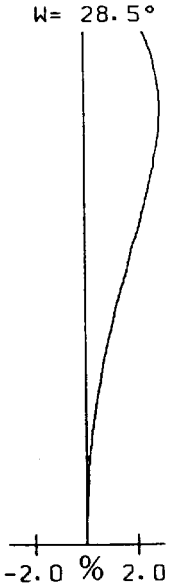
Figure 7A:
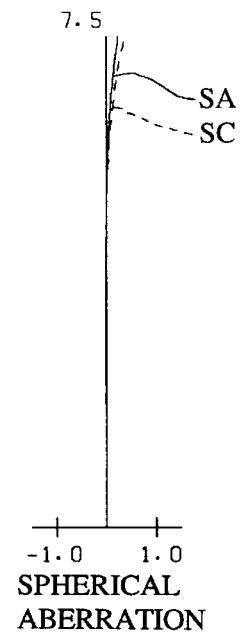
FIG. 7A, 7B, 7C, 7D show aberration diagrams of the zoom lens system shown in FIG. 5, at an intermediate focal length.
Figure 7B:
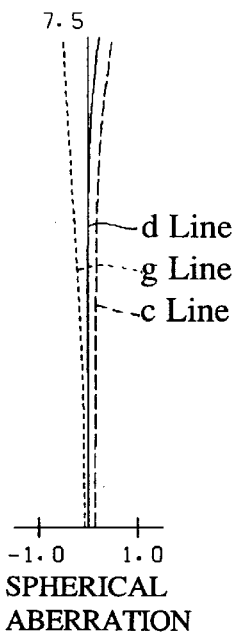
Figure 7C:
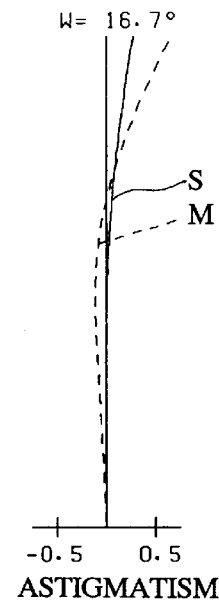
Figure 7D:
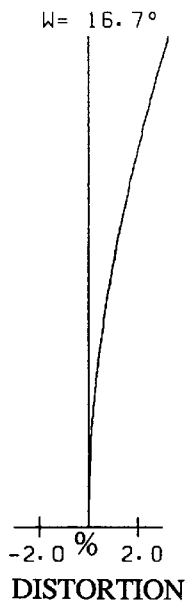
Figure 8A:
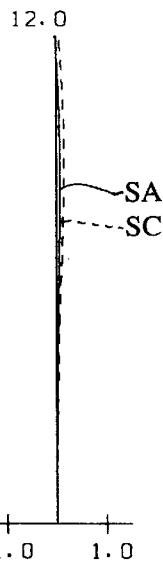
FIG. 8A, 8B, 8C, 8D show aberration diagrams of the zoom lens system shown in FIG. 5, at the long focal length extremity.
Figure 8B:
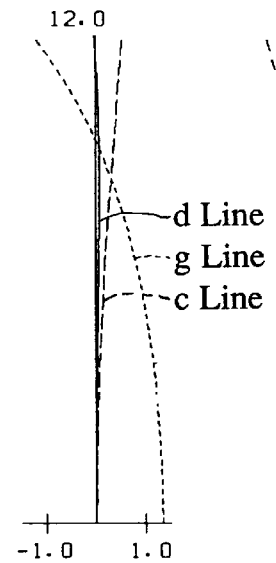
Figure 8C:
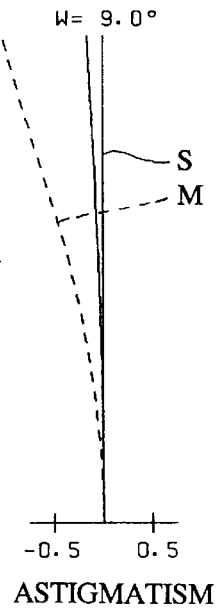
Figure 8D:
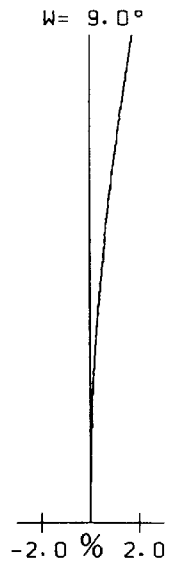

FIGS. 1 shows a lens arrangement of the first embodiment of the zoom lens system according to the present invention, in which the zoom lens system comprises a first positive lens group 10, a second positive lens group 20 including a negative lens element, and a third negative lens group 30, in this order from the object side. The first positive lens group comprises a negative lens element and a positive lens element in this order from the object side. The third lens group comprises a positive lens element and a negative lens element in this order from the object side. The diaphragm S is provided between the second and third lens groups 20 and 30 and is moved together with the second lens group. FIGS. 2A, 2B, 2C, 2D, 3A, 3B, 3C, 3D, 4A, 4B, 4C, 4D show aberration diagrams of the lens system shown in FIG. 1, at the short focal length extremity, an intermediate focal length, and the long focal length extremity, respectively.

Numerical data of the lens system shown in FIG. 1 is shown in Table 1 below. In the aberration diagrams, SA represents spherical aberration, SC represents the sine conditions; the d-line, the g-line and the C-line represent chromatic aberrations represented by spherical aberrations at the respective wavelengths, S represents the Sagittal plane, and M represents the Meridional plane.

Also, "$F_{NO}$" indicates the F-number, "f" indicates the focal length, "W" indicates the half angle of view, $f_B$ indicates the back focal distance, "R" indicates the radius of curvature, "D" indicates the lens thickness or distance between the lenses, "$N_d$" indicates the refractive index of the d-line, and "$v_d$" indicates the Abbe number.

The shape of the aspheric surface can be generally expressed as follows.

$$X = CY^2/\{1+[1-(1+k)C^2Y^2]^{1/2}\} + A4Y^4 + A6Y^6 + A8Y^8 + A10Y^{10} + \ldots$$

wherein,
Y designates a height above the axis,
X designates a distance from a tangent plane of an aspherical vertex,
C designates a curvature of the aspherical vertex (1/r), k designates a conic constant,
A4 designates a fourth-order aspherical factor,
A6 designates a sixth-order aspherical factor,
A8 designates a eighth-order aspherical factor; and,
A10 designates a tenth-order aspherical factor.

TABLE 1

$F_{NO} = 1:4.7–7.4–12.0$
f = 39.03–69.99–135.00 (zoom ratio: 3.46)
W = 28.5–16.8–9.0
$f_B$ = 9.88–29.70–66.55

| Surface No. | R | D | $N_d$ | $v_d$ |
|---|---|---|---|---|
| 1 | −35.100 | 1.50 | 1.84666 | 23.8 |
| 2 | −50.992 | 0.10 | — | — |
| 3 | 33.209 | 3.35 | 1.48749 | 70.2 |
| 4 | −71.400 | 2.50–9.40–17.45 | — | — |
| 5 | −20.138 | 1.50 | 1.88300 | 40.8 |
| 6 | 20.138 | 3.06 | 1.71736 | 29.5 |
| 7 | −62.447 | 3.07 | — | — |
| 8 | 18.660 | 2.62 | 1.84666 | 23.8 |
| 9 | 13.340 | 3.71 | 1.58636 | 0.0 |
| 10* | −19.635 | 1.30 | — | — |
| Diaphragm | ∞ | 13.95–7.41–2.30 | — | — |
| 11* | −114.387 | 2.60 | 1.58547 | 29.9 |
| 12 | −32.055 | 3.65 | — | — |
| 13 | −10.450 | 1.50 | 1.72916 | 54.7 |
| 14 | −146.467 | — | — | — |

*designates an aspherical surface with rotation symmetry about the optical axis.

Aspherical data:
No.10: K=0.0 A4=0.57364×10$^{-4}$, A6=−0.28134×10$^{-7}$,
  A8=0.0, A10=0.0, A12=0.0
No.11: K=0.0, A4=0.85525×10$^{-4}$, A6=−0.20968×10$^{-6}$,
  A8=0.70435×10$^{-8}$, A10=0.0, A12=0.0

EXAMPLE 2

FIGS. 5 through 8D show the second embodiment of the zoom lens system according to the present invention. FIG. 5 shows a lens arrangement thereof, in which the basic structure is the same as that of the first embodiment. FIGS. 6A, 6B, 6C, 6D, 7A, 7B, 7C, 7D and 8A, 8B, 8C, 8D show aberration diagrams at the short focal length extremity, an intermediate focal length, and the long focal length extremity.

TABLE 2

$F_{NO} = 1:4.6–7.2–11.5$
f = 39.00–69.90–135.00 (zoom ratio: 3.46)
W = 28.4–16.7–9.0
$f_B$ = 10.07–29.45–66.16

| Surface No. | R | D | $N_d$ | $v_d$ |
|---|---|---|---|---|
| 1 | −27.434 | 1.50 | 1.84666 | 23.8 |
| 2 | −36.338 | 0.10 | — | — |
| 3 | 45.392 | 3.22 | 1.48749 | 70.2 |
| 4 | −45.392 | 2.13–9.85–18.63 | — | — |
| 5 | −18.075 | 1.50 | 1.88300 | 40.8 |
| 6 | 33.467 | 0.20 | — | — |
| 7 | 19.425 | 2.20 | 1.83400 | 37.2 |
| 8 | 10.590 | 4.00 | 1.68893 | 31.1 |
| 9 | −45.756 | 1.53 | — | — |
| 10 | 28.142 | 2.00 | 1.84666 | 23.8 |
| 11 | 14.750 | 3.60 | 1.66625 | 0.0 |
| 12* | −22.786 | 1.00 | — | — |
| Diaphragm | ∞ | 14.66–8.33–3.22 | — | — |
| 13* | −43.507 | 2.95 | 1.58547 | 29.9 |
| 14 | −22.619 | 3.25 | — | — |

TABLE 2-continued $F_{NO} = 1:4.6–7.2–11.5$
f = 39.00–69.90–135.00 (zoom ratio: 3.46)
W = 28.4–16.7–9.0
$f_B$ = 10.07–29.45–66.16

| Surface No. | R | D | $N_d$ | $v_d$ |
|---|---|---|---|---|
| 15 | −10.574 | 1.50 | 1.69680 | 55.5 |
| 16 | −353.285 | — | — | — |

*designates an aspherical surface with rotation symmetry about the optical axis.

Aspherical data:
No.12: K=0.0, A4=0.33482×10$^{-4}$, A6=0.0,
  A8=0.0, A10=0.0, A12=0.0
No.13: K=0.0, A4=0.75727×10$^{-4}$, A6=0.14211×10$^{-6}$,
  A8=0.35816×10$^{-8}$, A10=0.0, A12=0.0

EXAMPLE 3

Figure 9:
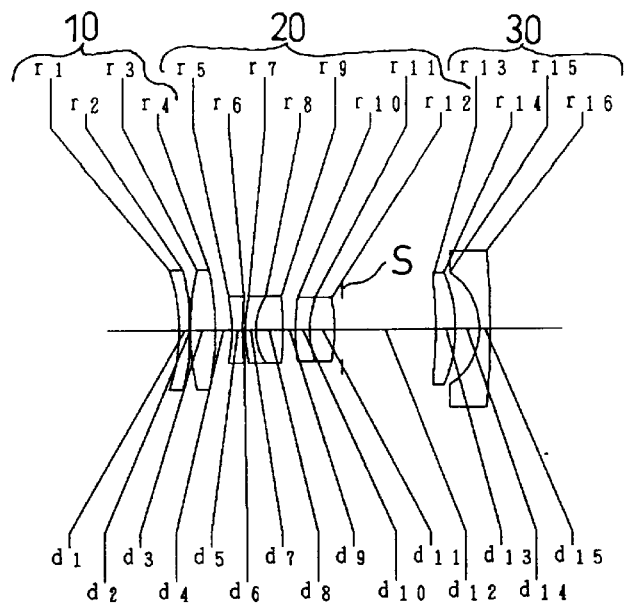
FIG. 9 is a schematic view of a lens arrangement of a zoom lens system according to the third embodiment of the present invention.
Figures 10A, 10B, 10C, 10D:
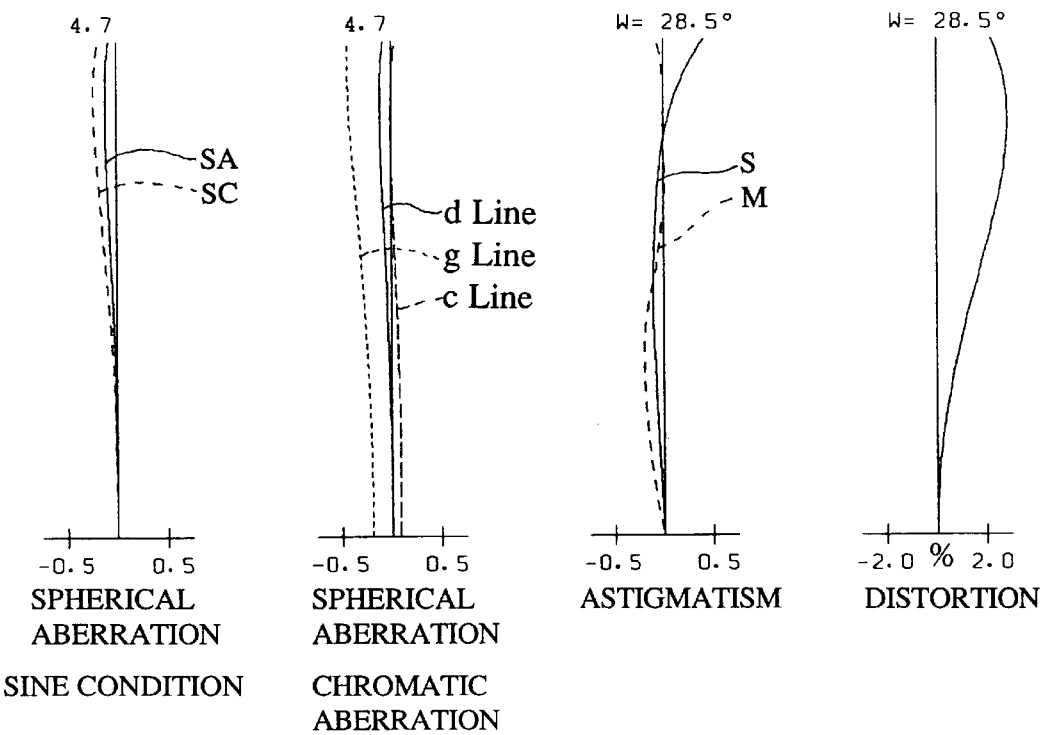
FIG. 10A, 10B, 10C, 10D show aberration diagrams of the zoom lens system shown in FIG. 9, at the short focal length extremity.
Figure 11A:
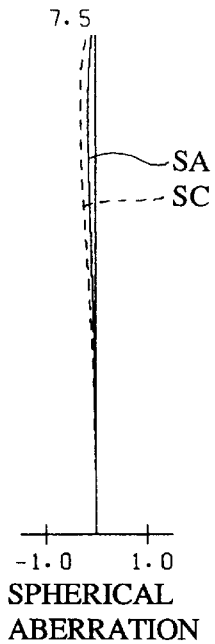
FIG. 11A, 11B, 11C, 11D show aberration diagrams of the zoom lens system shown in FIG. 9, at an intermediate focal length.
Figure 11B:
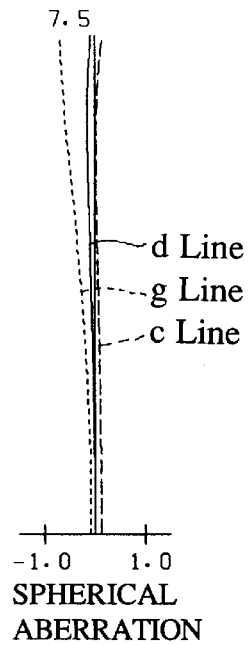
Figure 11C:
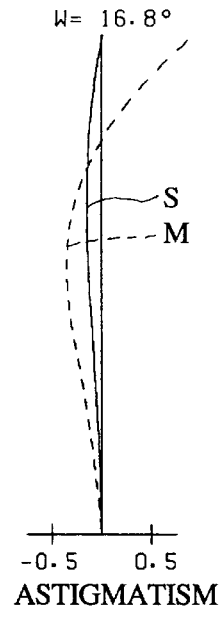
Figure 11D:
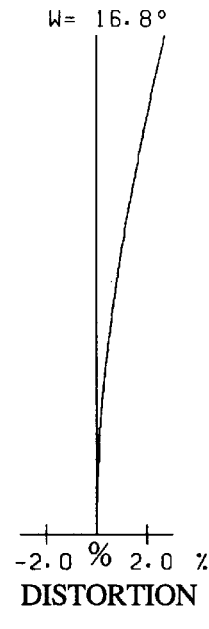
Figure 12A:
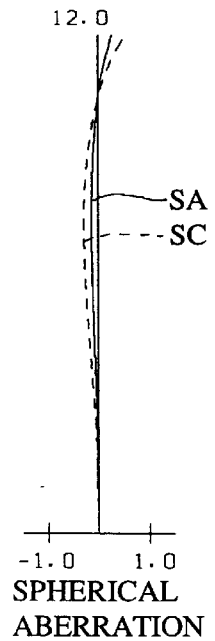
FIG. 12A, 12B, 12C, 12D show aberration diagrams of the zoom lens system shown in FIG. 9, at the long focal length extremity.
Figure 12B:
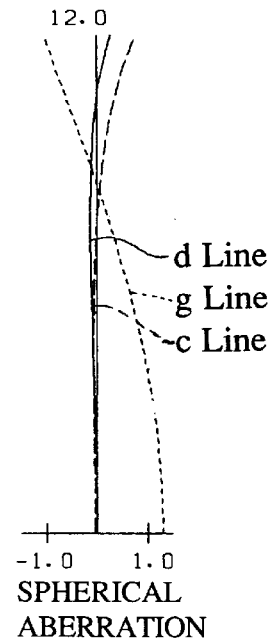
Figure 12C:
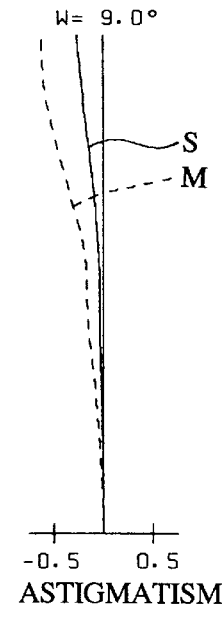
Figure 12D:
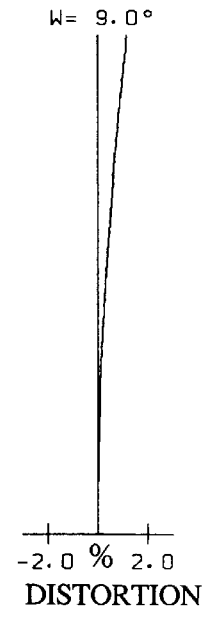

FIGS. 9 through 12D show the third embodiment of the zoom lens system according to the present invention. FIG. 9 shows a lens arrangement thereof, in which the basic structure is the same as that of the first embodiment. FIGS. 10A, 10B, 10C, 10D, 11A, 11B, 11C, 11D and 12A, 12B, 12C, 12D show aberration diagrams at the short focal length extremity, an intermediate focal length, and the long focal length extremity, respectively.

TABLE 3

$F_{NO} = 1:4.8–7.8–12.5$
f = 39.00–70.00–135.00 (zoom ratio: 3.46)
W = 28.5–16.8–9.0
$f_B$ = 9.99–29.37–67.21

| Surface No. | R | D | $N_d$ | $v_d$ |
|---|---|---|---|---|
| 1 | −25.160 | 1.50 | 1.84666 | 23.8 |
| 2 | −34.000 | 0.10 | — | — |
| 3 | 42.690 | 3.40 | 1.48749 | 70.2 |
| 4 | −42.690 | 2.41–9.68–16.35 | — | — |
| 5 | −19.500 | 1.50 | 1.88300 | 40.8 |
| 6 | 69.970 | 0.35 | — | — |
| 7 | 24.582 | 1.50 | 1.83400 | 37.2 |
| 8 | 9.000 | 3.84 | 1.69895 | 30.1 |
| 9 | −43.469 | 1.79 | — | — |
| 10 | 35.500 | 2.00 | 1.84666 | 23.8 |
| 11 | 14.548 | 3.50 | 1.66625 | 0.0 |
| 12* | −22.071 | 1.00 | — | — |
| Diaphragm | ∞ | 13.38–7.07–2.30 | — | — |
| 13* | −49.365 | 2.72 | 1.58547 | 29.9 |
| 14* | −22.950 | 3.45 | — | — |
| 15 | −9.680 | 1.50 | 1.69680 | 55.5 |
| 16 | −132.397 | — | — | — |

*designates an aspherical surface with rotation symmetry about the optical axis.

Aspherical data:
No.12: K=0.0, A4=0.86288×10$^{-5}$, A6=−0.25464×10$^{-6}$,
  A8=0.0, A10=0.0, A12=0.0
No.13: K=0.0, A4=0.77628×10$^{-4}$, A6=−0.46815×10$^{-6}$,
  A8=0.99224×10$^{-8}$, A10=0.0, A12=0.0
No.14: K=0.0, A4=−0.19268×10$^{-4}$, A6=−0.31624×10$^{-6}$,
  A8=−0.25345×10$^{-8}$, A10=0.0, A12=0.0

EXAMPLE 4

FIGS. 13 through 16D show the fourth embodiment of the zoom lens system according to the present invention. FIG. 13 shows a lens arrangement thereof, in which the basic structure is the same as that of the first embodiment. FIGS.

14A, 14B, 14C, 14D, 15A, 15B, 15C, 15D and 16A, 16B, 16C, 16D show aberration diagrams at the short focal length extremity, an intermediate focal length, and the long focal length etremity, respectively.

TABLE 4

$F_{NO}$ = 1:4.7–7.5–12.0
f = 39.01–69.98–135.00 (zoom ratio: 3.46)
W = 28.5–16.8–9.0
$f_B$ = 9.86–29.71–66.94

| Surface No. | R | D | $N_d$ | $\nu_d$ |
|---|---|---|---|---|
| 1 | −34.104 | 1.50 | 1.84666 | 23.8 |
| 2 | −48.983 | 0.10 | — | — |
| 3 | 33.600 | 3.35 | 1.48749 | 70.2 |
| 4 | −68.000 | 2.50–9.59–17.45 | — | — |
| 5 | −19.920 | 1.50 | 1.88300 | 40.8 |
| 6 | 19.920 | 2.91 | 1.76182 | 26.5 |
| 7 | −287.519 | 0.64 | — | — |
| 8 | 33.000 | 2.00 | 1.51823 | 59.0 |
| 9 | 392.420 | 1.59 | — | — |
| 10 | 23.537 | 1.50 | 1.84666 | 23.8 |
| 11 | 16.000 | 3.57 | 1.58636 | 0.0 |
| 12* | −19.904 | 1.30 | — | — |
| Diaphragm | ∞ | 14.21–7.51–2.30 | — | — |
| 13* | −123.609 | 2.60 | 1.58547 | 29.9 |
| 14 | −32.594 | 3.60 | — | — |
| 15 | −10.663 | 1.50 | 1.72916 | 54.7 |
| 16 | −174.303 | — | — | — |

*designates an aspherical surface with rotation symmetry about the optical axis.

Aspherical data:
No.12: K=0.0, A4=0.52537×10$^{-4}$, A6=−0.18561×10$^{-7}$, A8=0.0, A10=0.0, A12=0.0
No.13: K=0.0, A4=0.80546×10$^{-4}$, A6=−0.15656×10$^{-6}$, A8=0.59799×10$^{-8}$, A10=0.0, A12=0.0

Table 5 below shows numerical values of conditions (1) through (4) for the four embodiments mentioned above.

TABLE 5

|  | Embodiment 1 | Embodiment 2 | Embodiment 3 | Embodiment 4 |
|---|---|---|---|---|
| Condition (1) | −0.14 | −0.15 | −0.19 | −0.13 |
| Condition (2) | 1.865 | 1.855 | 1.855 | 1.865 |
| Condition (3) | 0.13 | 0.12 | 0.13 | 0.13 |
| Condition (4) | 0.20 | 0.20 | 0.20 | 0.20 |

As can be seen from Table 5, each embodiment satisfies conditions (1) through (4), and the aberrations are well compensated. Astigmatism particularly at the short focal length extremity is satisfactorily corrected.

As may be understood from the above discussion, according to the present invention, a small zoom lens system of a high zoom ratio for a compact camera whose back focal distance is short can be obtained.

What is claimed is:

1. A zoom lens system comprising at least three lens groups including a first lens group having a positive focal length, a second lens group having a positive focal length and having at least one negative lens element, and a third lens group having a negative focal length, in this order from the object side, wherein upon zooming from the short focal length extremity toward the long focal length extremity, all the lens groups are moved toward the object side, and the distance between the first and second lens groups increases and the distance between the second and third lens groups decreases, and wherein said zoom lens system satisfies the following conditions (1) and (2):

$$-0.3 < f_W/f_{1G} + f_W/f_{2G} + f_W/f_{3G} < 0 \tag{1}$$

$$1.845 < N_{2Gn} \tag{2}$$

wherein
 $f_W$ designates the focal length of the entire optical system at the short focal length extremity,
 $f_{1G}$ designates the focal length of the first lens group ($f_{1G} > 0$),
 $f_{2G}$ designates the focal length of the second lens group ($f_{2G} > 0$),
 $f_{3G}$ designates the focal length of the third lens group ($f_{3G} < 0$),
 $N_{2Gn}$ designates the average refractive index of all the negative lens elements of the second lens group.

2. A zoom lens system according to claim 1, wherein the first lens group comprises a negative lens element and a positive lens element in this order from the object side.

3. A zoom lens system according to claim 1, wherein the third lens group comprises a positive lens element and a negative lens element in this order from the object side.

4. A zoom lens system according to claim 1, wherein said zoom lens system satisfies the following condition (3):

$$0.05 < \Sigma d_{1G}/f_W < 0.2 \tag{3}$$

wherein $\Sigma_{d1G}$ designates the distance along the optical axis between the most object-side surface and the most image-side surface of the first lens group.

5. A zoom lens system according to claim 1, wherein said zoom lens system satisfies the following condition (4):

$$0.1 < \Sigma_{d3G}/f_W < 0.25 \tag{4}$$

wherein $\Sigma_{d3G}$ designates the distance along the optical axis between the most object-side surface and the most image-side surface of the third lens group.

* * * * *